United States Patent [19]

Lewandowski

[11] 4,346,339

[45] Aug. 24, 1982

[54] APPARATUS FOR AUTOMATIC REGULATION OF AC POWER

[75] Inventor: Walter S. Lewandowski, Collegeville, Pa.

[73] Assignee: Sperry Corporation, New York, N.Y.

[21] Appl. No.: 201,936

[22] Filed: Oct. 29, 1980

[51] Int. Cl.³ .............................................. G05F 1/455
[52] U.S. Cl. ..................................... 323/245; 219/494; 307/364; 323/300
[58] Field of Search .................. 219/494, 501, 510; 307/357, 361, 364, 252 B, 252 R; 323/235–237, 241, 245, 267, 271, 300, 319, 320, 322–326, 902

[56] References Cited

U.S. PATENT DOCUMENTS

| 3,684,172 | 3/1972 | Evalds | 236/78 |
| 3,805,184 | 4/1974 | Visioli et al. | 323/245 X |
| 3,860,169 | 1/1975 | Norman | 219/494 X |
| 3,924,102 | 12/1975 | Hanekom | 219/494 X |
| 4,078,393 | 3/1978 | Wills | 323/245 X |
| 4,122,384 | 10/1978 | Suzuki | 323/326 X |

FOREIGN PATENT DOCUMENTS 46-35108  10/1971  Japan ................................ 323/326

Primary Examiner—A. D. Pellinen
Attorney, Agent, or Firm—Robert E. Lee, Jr.; Martey R. Perman

[57] ABSTRACT

A closed loop phase control circuit. The circuit senses the temperature of a load circuit. It also senses the line voltage on each line of a multi-phase system. The sensed line voltage is full-wave rectified. Comparators for each phase compare an input signal indicative of the temperature of the load circuit with the full-wave rectified line voltage in the corresponding phase and develops an output signal when the full-wave rectified line voltage exceeds the input signal indicative of the temperature of the load circuit. Ultimately, triacs, which are in series with the load for each phase, respond to the existence of an output signal from the corresponding comparators and to a pulse from a timer and conduct in response thereto. When a triac conducts, line current is delivered to its corresponding load resistance. In this way, the time for delivery of line current (and line voltage) to the load resistance varies in accordance with the temperature of the load. Therefore, power to the load resistance is regulated in accordance with the thermal condition of the load resistance. A set point temperature at the load is thereby maintained.

2 Claims, 2 Drawing Figures

APPARATUS FOR AUTOMATIC REGULATION OF AC POWER

FIELD OF THE INVENTION

This invention relates to a closed loop phase control circuit for regulating the amount of power delivered to a load based on the value of a predetermined parameter of the load.

BACKGROUND OF THE INVENTION

In a system that delivers power to a load, when variable loads are used, such as radiant heaters, incandescent or infrared lamps, or power supplies, a varying parameter such as temperature at the particular load being used will result unless the power delivered to the load is varied in a certain manner to compensate for the parameter variation. When a set value of the parameter at the load is necessary, the need for a power regulation or automatic phase control system becomes apparent.

Accordingly, it is an object of the present invention to regulate the amount of power delivered to a load circuit based on the condition of a predetermined parameter of the load;

It is another object of the present invention to regulate the amount of power delivered to each of the load circuits in a three-phase system based on the condition of a predetermined parameter of the load;

It is still another object of the present invention to maintain equilibrium in the value of a predetermined parameter in the load circuits of a three-phase system by sensing the value of the predetermined parameter of the load and varying the power delivered to the load in accordance therewith.

In order to achieve the above objects of the present invention, a closed loop phase control system for AC Loads has been developed which will assure a "zero-volts" startup and, subsequently, will automatically regulate the amount of power delivered to the load. Although the phase control system can be used with a multi-phase system, it is NOT limited for use with such a system and may be used in conjunction with a single phase system. The initial power turn on occurs always at near "zero voltage" and it starts with a full conduction (180° angle) of the solid state switch (Triac) delivering maximum power to the load. As the sensor output varies, in response to a rising temperature at the load, the conduction angle of the solid state switch will decrease, thus regulating the amount of power required to maintain a given set point temperature at the load. Present technique utilizes a "Time Proportioning ON-OFF Control" which delivers 100% power during the ON period and none during the OFF period, or a manual phase control. The ON and OFF cycles typically last for many cycles of the power source voltage. This low cost circuit combines a "zero voltage switch" at the turn on of the load and a continuous phase control thereafter. The automatic phase control circuit constantly supplies a required amount of load power to maintain thermal equilibrium at a set point. The amount of power delivered to the load can be controlled within each half cycle of the power source voltage. The above technique eliminates ON-OFF switching surges harmful to the filaments and prevents "Overheat" conditions during the ON cycle and "No Heat" during the OFF cycle.

SUMMARY OF THE INVENTION

The closed loop phase control system of the present invention comprises a step down multi-phase transformer which provides an AC reference level voltage signal for the control system. The signals from the step down transformer are full-wave rectified and a full wave rectified reference voltage signal is developed for each phase corresponding to the line voltage delivered to each of the phases. A temperature sensor senses the temperature at the load and develops a voltage signal indicative thereof. A comparator for each phase compares the full-wave rectified reference voltage signal for each phase with the voltage signal from the temperature sensor and develops an output signal when the full-wave rectified reference voltage signal exceeds the voltage signal from the temperature sensor. A first gate for each phase develops an output in response to a start signal and the output signals from each of the corresponding comparators. A second gate develops an output in response to the outputs from each of the first gates. The output from the second gate triggers a timer which in turn discharges a capacitor in an RC combination having a time constant of approximately 200 microseconds ($\mu$s). A 200 $\mu$s pulse is developed from the timer and is provided as one input to a plurality of LED Drivers, the number of LED drivers corresponding to the number of phases. One input to each of the LED Drivers is provided from the respective output from each corresponding comparator in each phase of the multi-phase system. The LED Drivers for each phase drive optical isolators and gate control circuits for each of the respective phases for triggering triacs which are in electrical series with each of the respective loads in the multi-phase system.

Consequently, the rectified line voltage delivered to each of the loads is compared with the temperature at the load, and a triac for the respective load is triggered to start delivering power to the respective load when the rectified line voltage attempted to be delivered to the respective load exceeds the temperature at the load.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention, will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
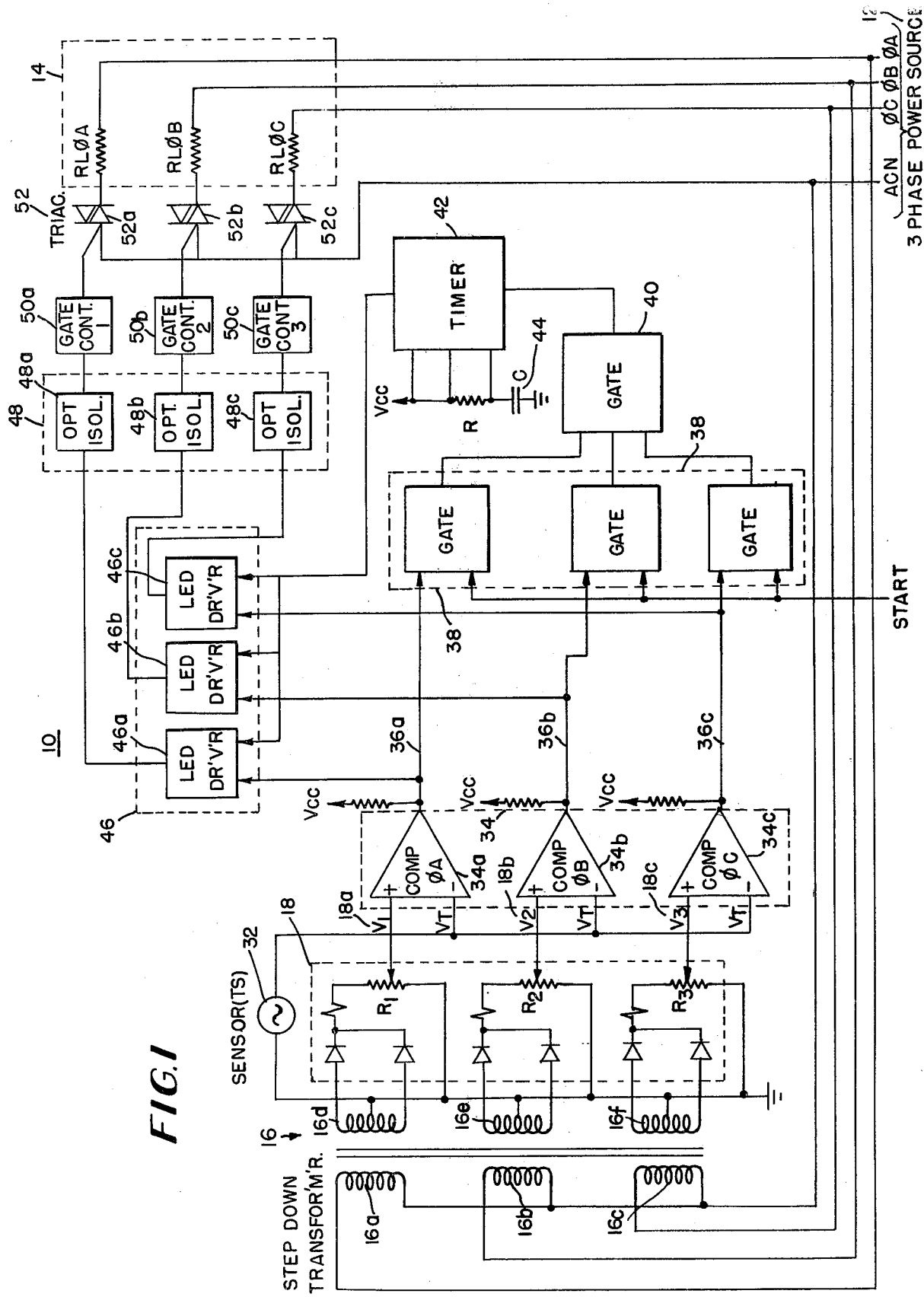
FIG. 1 represents one embodiment of the automatic phase control system of the present invention which regulates the power delivered to the load based on the temperature at the load thereby maintaining thermal equilibrium at the load.

Referring in detail to the FIG. 1, a preferred embodiment of the closed loop phase control system 10 of the present invention is shown as including a three-phase power source 12 for energizing a load 14. In the drawing, three phases are shown as indicated by $\phi A$, $\phi B$, $\phi C$.

Figure 2:
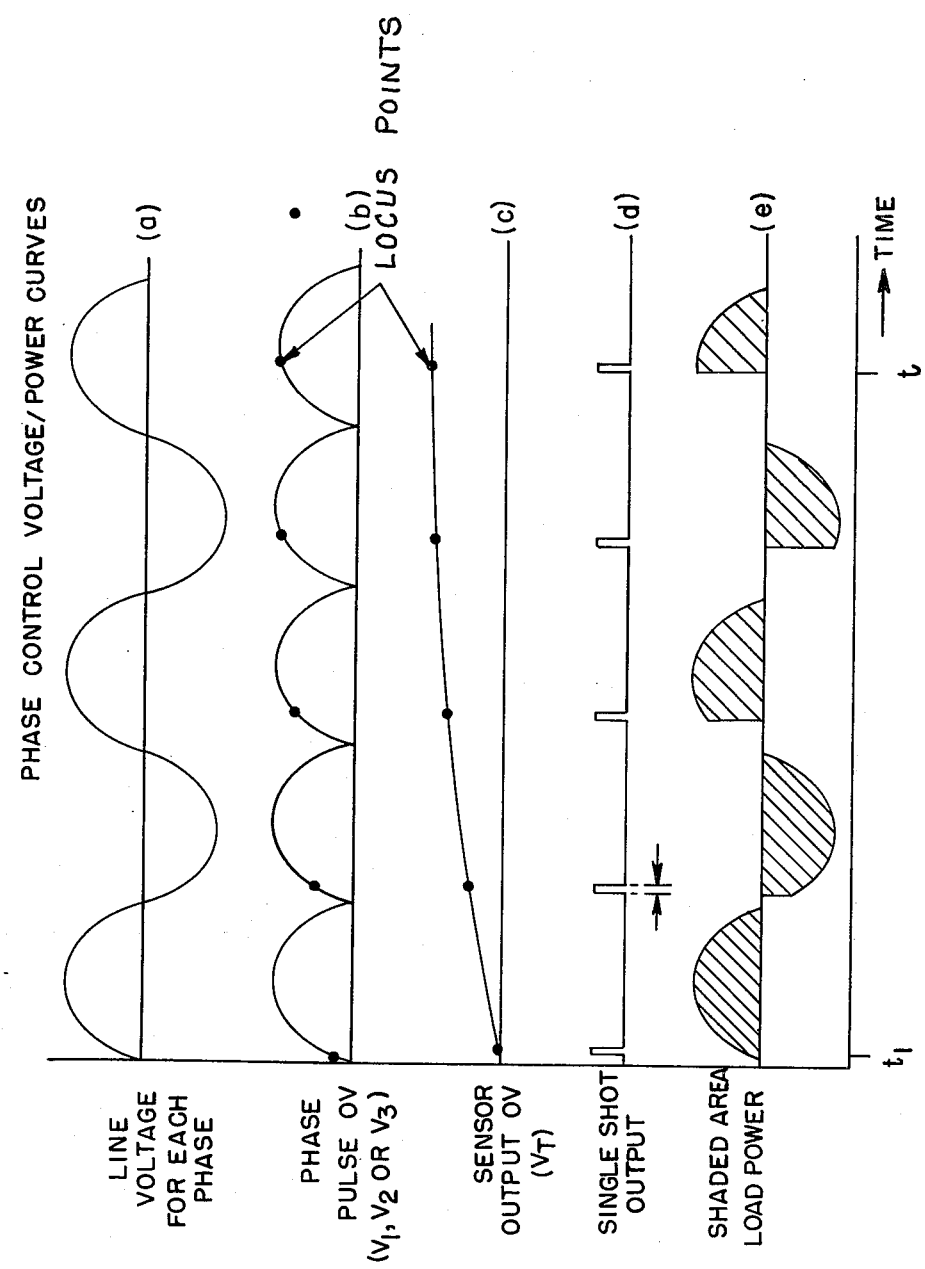
FIG. 2 illustrates voltage waveforms which are present at various points of the circuit shown in FIG. 1.

A step down transformer 16 includes three primary windings 16a, 16b, and 16c which are correspondingly connected to each of the three phases $\phi A$, $\phi B$, and $\phi C$ of the three-phase power source 12. A line voltage is delivered to each phase $\phi A$, $\phi B$, and $\phi C$, the line voltage for each phase being approximately 120° out of phase with respect to the line voltage for an adjacent phase. A typical line voltage, delivered to each phase, is shown in FIG. 2a of the drawings. These line voltages are sensed by the primary windings 16a, 16b, and 16c of the step down transformer 16. The step down transformer 16 also includes at least three secondary windings 16d, 16e, and 16f associated with the corresponding primary windings 16a, 16b, and 16c.

A full-wave rectifier 18 is connected to the output terminals of the secondary windings 16d, 16e, and 16f in order to full-wave rectify (i.e. to generate a unidirectional waveform) each of the three output signals occurring at the output terminals of the corresponding secondary windings 16d, 16e, and 16f. The output voltage appearing at the output terminals of the full-wave rectifier 18 associated with the secondary winding 16d, 16e, and 16f is shown in FIG. 2b. These voltages are represented by the symbols $V_1$, $V_2$, and $V_3$, and are present to the output terminals 18a, 18b, and 18c associated with the threshold adjusting resistors $R_1$, $R_2$, and $R_3$ of the full-wave rectifier 18. These voltages $V_1$, $V_2$, and $V_3$ correspond to the ½ cycle power being delivered to load resistors $RL\phi A$, $RL\phi B$, and $RL\phi C$ via phase $\phi A$, $\phi B$, and $\phi C$, respectively.

Voltage $V_2$ as indicated by reference numeral 18b and voltage $V_3$ as indicated by reference numeral 18c correspond to the power delivered to the load resistors $RL\phi B$ and $RL\phi C$, respectively, via phases $\phi B$ and $\phi C$, respectively. Since each of these voltages $V_1$, $V_2$, and $V_3$ are associated with each of the three phases, they will each be 120° out of phase with respect to one another. Voltage $V_2$ indicated by 18b, and voltage $V_3$, indicated by 18c, each are similar to the waveform shown in FIG. 2b. Voltage $V_2$ is 120° out of phase with respect to voltage $V_1$, and voltage $V_3$ is 240° out of phase with respect to voltage $V_1$.

A sensor 32 senses the value of a predetermined parameter which exists at the load 14 shown in FIG. 1. In the preferred embodiment, the predetermined parameter is temperature. As the ambient temperature near one or all of the load resistances (heaters) $RL\phi A$, $RL\phi B$, or $RL\phi C$ varies, the sensor provides an output voltage which varies in accordance therewith. An example of the voltage output of the temperature sensor 32 is shown in FIG. 2c of the drawings of the present application. This voltage is represented by the symbol $V_T$.

A comparator means 34 is shown in FIG. 1 which includes comparators 34a, 34b, and 34c. Each of these comparators 34a, 34b, and 34c have their plus terminals connected to the voltages $V_1$, $V_2$, and $V_3$ appearing at the output of the full-wave rectifier 18 via resistances $R_1$, $R_2$, and $R_3$. Each of these comparators have their negative terminals connected to the voltage $V_T$ associated with the temperature sensor 32. Accordingly, when the voltage appearing at the positive terminal of the comparators 34a, 34b, and 34c, represented by voltages $V_1$, $V_2$, and $V_3$, as shown in FIG. 2b, exceeds the voltage $V_T$ which exists at the negative input terminal of each of these comparators, as shown in FIG. 2c, an output signal is developed from these comparators. This output signal appears on line 36a, 36b, or 36c.

These output signals from comparators 34, appearing on lines 36a, 36b, and 36c are provided as input signals to a corresponding number of gates 38. The gates 38 are enabled by a high START signal which is continuously provided to gates 38 when the three phase power source 12 is turned on. Gate 38 is commonly known as an inverting output AND GATE OR NAND gate, and has associated therewith the following truth table:

|  | lead 2 input | |
|---|---|---|
|  | 1 | 0 |
| lead 1 input 1 | 0 | 1 |
| lead 1 input 0 | 1 | 1 |

Gate 38 will produce a low output when a high input appears at both of the input terminals. On the other hand, gate 38 will produce a high output in response to the appearance of a low input signal to any one of the two input terminals of gate 38.

Another gate 40 is responsive to the output signals developed from each of the three gates 38. Gate 40 will develop a low output signal when any one of the input terminals to gate 40 is low. If the signals appearing at each of the input terminals to gate 40 are all high, only then will a high output signal be developed therefrom. Gate 40 is commonly referred to as a three input AND gate.

A timer 42 is responsive to a low output signal from gate 40. The timer 42 has an internal count setting predeterminedly set therein. The timer 42 also has an RC circuit associated therewith. The capacitor 44 associated with the RC circuit has been charged to its fullest extent. When a low output signal is developed from gate 40, timer circuit 42 will develop a pulse of a predetermined pulse width, such as 200 microseconds. The pulse width is determined by the RC time constant of the RC circuit and by the internal count setting of the timer 42. The output pulse from timer 42 is shown in FIG. 2d of the drawings of the present application. Timer 42 could be selected from one of the following vendors using their corresponding part number: Univac 2899528, or Signetics 555 timer.

Light emitting diode driver (LED) circuitry 46 receives the pulse output (E.G., the 200 μs pulse) from the timer 42, determines whether this pulse is a first phase pulse, a second phase pulse, or a third phase pulse, amplifies to some extent the corresponding pulse energizing the driver 46, and energizes a light emitting diode in the optical isolator 48. The LED drivers 46 include a first LED driver 46a, a second LED driver 46b and a third LED driver 46c. Each of the respective LED drivers 46a through 46c have two input terminals. One of the input terminals receives the output pulse from timer 42. The other input terminal to each of the LED drivers 46a, 46b, and 46c are connected to the output terminals of the comparators 34a, 34b, and 34c, respectively. In view of the fact that these LED drivers are connected to the outputs of the comparators 34, the LED driver circuitry 46 will be able to discern whether or not the 200 microsecond pulse delivered from the timer originates from the first phase, the second phase, or the third phase of the three-phase power source 12. For example, LED driver 46a will develop an output pulse when energized by the high output of comparator 34a associated with the first phase 22 and by the high 200 microsecond pulse delivered from timer 42. The other LED drivers 46b and 46c will remain unenergized at one of their input terminals from comparators 34b and 34c. The LED drivers 46a, 46b, and 46c, act as NAND gates, each having associated therewith the following truth table:

|  | lead 2 input to LED Driver | |
|---|---|---|
|  | 1 | 0 |
| lead 1 input to LED Driver  1 | 0 | 1 |
|  0 | 1 | 1 |

When both inputs to the LED drivers 46a, 46b, or 46c are high, a low output will be developed. If either of the input terminals to these drivers are low, a high output will be developed from the LED drivers 46a through 46c. If both of the input terminals to these LED drivers are low, a high output will be developed therefrom.

Optical isolator circuitry 48 receives the output pulse from the LED driver circuitry 46. The optical isolator circuitry 48 includes a first optical isolator 48a, a second optical isolator 48b and a third optical isolator 48c. These optical isolators 48a, 48b, and 48c, are connected at their input terminals to the first LED driver 46a, the second LED driver 46b, and the third LED driver 46c, respectively. These optical isolators 48 include a light emitting diode which develops a source of light in response to the low output signal from the LED drivers 46. When the light emitting diode emits a light, a transistor, responsive thereto, will conduct. This, in turn, causes the optical isolators 48 to develop an output signal therefrom.

A gate control is responsive to the output signal from the optical isolators 48. This gate control includes a first gate control 50a, a second gate control 50b, and a third gate control 50c, each connected at their input terminals to optical isolators 48a, 48b, and 48c, respectively. Each of these gate controls 50a, 50b, and 50c function as a current switch for controlling the current to be delivered to the input of the triac circuitry 52 comprising triacs 52a, 52b, and 52c. The gate control circuits 50a, 50b, and 50c also prevent the firing of the remaining triacs when one of the triacs is short circuited.

Each of the triacs 52a, 52b, and 52c lie in electrical series with load resistances $RL\phi A$, $RL\phi B$, and $RL\phi C$, and have input terminals which are responsive to the output signals delivered from gate controls 50a, 50b, and 50c, respectively. For example, when an input triac 52a is energized by a pulse from the gate control 50a, the triac 52a conducts thereby energizing its respective load resistor $RL\phi A$. The triac 52a will start conducting at a point in time determined by the value of potential $V_T$ from temperature sensor 32, as compared with the value of voltages $V_1$, $V_2$, or $V_3$, which are the output of the full-wave rectifiers 18a, 18b, and 18c. The triac continues to conduct (once it is triggered by the 200 microsecond pulse) until the current (associated with a voltage phase) through the triac falls to zero. It will not begin to conduct again until triggered by the 200 microsecond pulse. When the load is all resistance as it is in a resistive heater, the current and voltage are in phase so the triac stops conducting when the voltage phase associated with the triac goes to zero. If the temperature sensor 32 senses a relatively high temperature at the load resistance $RL\phi A$, for example, a relatively high potential $V_T$ is delivered to the minus input terminal of comparators 34a, 34b, and 34c. Consequently, the voltage $V_1$ at the plus terminal of the comparator 34a must exceed the potential $V_T$ at the minus input terminal of this comparator in order to develop an output from the comparator 34a which will ultimately fire triac 52a. Consequently, the triac, associated with the particular phase being energized, will not fire until the corresponding voltage $V_1$, $V_2$, or $V_3$ exceeds potential $V_T$. This means that the associated triac is conducting for less time during the associated phase cycle.

Referring to FIGS. 2b and 2c, note the "Locus Points" referred to therein. The "Locus Points" on the waveforms of FIGS. 2b and 2c are defined as the particular points on both of these waveforms wherein the rectified line voltage or phase pulse ($V_1$, $V_2$, or $V_3$) in FIG. 2b is substantially equal to the sensor (32) output ($V_T$) at particular points in time. As can be seen from FIG. 2b, the location of the Locus Points on the up-swing portion of the cycles in FIG. 2b will gradually increase from zero (0) to $V_1$, $V_2$, or $V_3$ to correspond to the increasing sensor output ($V_T$). Consequently, when the phase pulse $V_1$, $V_2$, or $V_3$ reaches, in magnitude, a location on the up-swing portion of the cycle which corresponds to its Locus Point, the magnitude of the phase pulse $V_1$, $V_2$, or $V_3$ will then be substantially equal to or slightly greater than the magnitude of the corresponding Locus Point on the sensor output (32) curve represented by the potential $V_T$. When this happens, an output from the corresponding comparator 34a, 34b, or 34c, corresponding to the phase pulse $V_1$, $V_2$, or $V_3$, respectively, will be developed.

In FIG. 2e, a waveform is shown which is indicative of the load power delivered to a load during various portions of the cycle of the full-wave rectified wave form shown in FIG. 2b. Note that the wave form shown in FIG. 2e begins its cycle at a point when the Locus Point of the waveform in FIG. 2b has a magnitude which is equal to or greater than the magnitude of the Locus Point on the wave form shown in FIG. 2c. Consequently, as the temperature at the load 14 increases, as shown in FIG. 2c, the load power delivered to the load 14 will gradually decrease, as indicated by the shaded portion of the waveform, at various points in time, as shown in FIG. 2e.

In operation, a line voltage will be delivered from the three-phase power source 12, as indicated in FIG. 2a. This line voltage in FIG. 2a will appear at each of the three phases associated with the three-phase power source, each of the phases being 120° out of phase with respect to one another. The line voltage shown in FIG. 2a will appear at the input primary winding of the step down transformer 16, as indicated by reference numerals 16a, 16b, and 16c. The secondary of the step down transformer 16 is connected directly to a full-wave rectifier 18 such that the output of the full-wave rectifier 18 will develop full-wave rectified voltages $V_1$, $V_2$, and $V_3$ which are 120° out of phase with respect to one another, each of which appear similar to the voltage waveform shown in FIG. 2b of the drawings of the present application.

A temperature sensor 32 will detect the ambient temperature due to the individual load resistances $RL\phi A$, $RL\phi B$, and $RL\phi C$. Consequently, the sensor 32 will provide a voltage output, $V_T$, proportional to the ambient temperature. This voltage, $V_T$, will be input to the negative input terminal of comparators 34a, 34b, and 34c. The potential $V_T$, indicative of the reading of the temperature sensor 32, and of the ambient temperature due to the individual load resistances, appears, as an example, in FIG. 2c of the drawings in the present application. Note the various "Locus Points" along the waveforms shown in FIGS. 2b and 2c of the drawings. As the ambient temperature due to the load 14 increases, the potential $V_T$ will also increase, gradually, as indicated in FIG. 2c. Consequently, the full-wave rectified signal shown in FIG. 2b must rise to a point which exceeds the potential $V_T$, at that point in time, in order to develop an output signal from one of the respective comparators 34a, 34b, or 34c.

Gates 38 will develop a low output signal when energized by a corresponding one of the outputs from comparators 34a, 34b and 34c and by a "START" signal is generated when the power source 12 is energized. A gate 40 will develop a low output signal in response to a low output signal delivered from any one of the gates 38. The low output from gate 40 causes timer 42 to develop a pulse (e.g., 200 μs), the pulse width of this pulse being determined by the RC time constant of the resistor R, capacitor C (44) combination and by the internal count setting of timer 42.

The pulse from timer 42 is input to each of the input terminals of the LED drivers 46a, 46b, and 46c. The other input terminal of each of these LED drivers are connected to a corresponding one of the outputs of comparators 34a, 34b, and 34c, respectively. Consequently, only one of the LED drivers 46a, 46b, or 46c will develop an output signal (a low output signal) at any one point in time. There will be only one output signal developed from one of the comparators 34a, 34b, or 34c, as determined by the particular phase $\phi A$, $\phi B$ or $\phi C$ being energized.

In response to this low output signal from one of the LED drivers, one of the optical isolators 48a, 48b, or 48c will be energized. A light emitting diode in the energized optical isolator will emit light thereby conducting a transistor which will in turn develop an output signal energizing one of the gate controls 50a, 50b, or 50c. Consequently, one of the triac's 52a, 52b, or 52c will be energized at their gate terminals thereby causing this triac to conduct in response thereto until the current through the triac and associated with a voltage phase drops to zero. Since the triacs are in electrical series with the load resistances, the load resistor associated with the conducting triac will be energized by a current originating from the three-phase power source 12.

In this way, the output power delivered to the load 14 will vary depending upon the temperature of the load 14, as sensed by the sensor 32. Since the comparators 34 are responsive to the line voltage at the plus terminal and the temperature of the load at the negative terminal, an output signal will be developed from the comparator 34 only when the line voltage exceeds the voltage indicative of the temperature at the load 14. As a result, the triac, associated with the phase undergoing energization, will conduct only when the line voltage in this phase exceeds the voltage indicative on the temperature at the load. In this way, the power delivered to the load will be regulated in accordance with the temperature at the load, thereby maintaining a set point temperature at the load 14.

It should be understood that the control circuit of this invention can employ variations in parameters other than temperature to control the power delivered to loads other than heaters. For example, a magnetic field detector can be used as the sensor in the subject invention to control the current delivered to a coil. Similarly, a light detector can be used as a sensor to control the strength of a signal transmitted by a light source.

The phase control circuit of this invention also includes an emergency shut off means for disconnecting the three phase power source from the load should the ambient temperature exceed a predetermined maximum value. This is accomplished by providing a separate sensor (not shown in the Figures) which transmits a signal to a relay (not shown in Figures) when the predetermined maximum temperature occurs. The relay activates a switch (not shown in the Figures) in each of the lines connecting the three phase power source to the resistors $RL\phi A$, $RL\phi B$, and $RL\phi C$.

The following components of the circuit shown in FIG. 1 can be obtained from the vendors as shown by the following table which appears below:

| COMPONENT IN FIG. 1 | MANUFACTURER AND PART NO. |
|---|---|
| Temperature sensor (32) | CE MARK 4 Concept Engineering |
| Timer (42) | UNIVAC 2899 528 Signetics 555 Timer |
| Optical Isolator (48) | Motorola MCS 2400 Monsanto MCS 2400 UNIVAC 4916220 |
| Comparator (34) | National Semiconductor LM 139 Signetics LM139 |
| Gate Control (50) | Motorola MDA 920-6 |
| LED Drivers (46) | Signetics 75452 (Dual Peripheral Driver) |
| Transformer (16) | STANCOR CORP P6134 |
| GATES (38) | Texas Instruments TI 74LS00 QUAD-2 Input NAND Gates |
| GATE (40) | Texas Instruments TI 74LS11 (3 input AND gate) |
| Triac (52) | RCA T6401M (Thyristor) |

What is claimed is:
1. A closed loop phase control system for controlling an amount of power delivered to a load on a multi-phase power line comprising:
   a multi-phase power source means connected to said load by a plurality of power lines for providing an AC current flow through said load, each of said power lines associated with a different phase line voltage;
   reference voltage means connected to said plurality of power lines for sensing and rectifying each of said different phase AC line voltages whereby a cyclic rectified reference voltage is generated from each of said different phase AC line voltages;

parameter sensing means for sensing the value of a predetermined parameter of said load that is sensitive to said current flow and developing a sensor voltage signal indicative of said value;

comparator means connected to said reference voltage means for comparing each of the reference voltages associated with one of said power lines with said sensor voltage signal and developing a trigger signal when one of said reference signals is greater than or substantially equal to said sensor voltage signal;

first circuitry means for generating a switching pulse of a predetermined pulse width in response to each of said trigger signals from said comparator means and for transmitting said pulse along one of a plurality of gating lines corresponding to one of said plurality of power lines, said first circuitry means further comprising: a single switching pulse generating circuit coupled to said comparator means; and selection circuit means coupled to said comparator means and to said single switching pulse generating circuit for automatically selecting one of said plurality of gating lines corresponding to one of said plurality of power lines associated with said trigger signal along which selected gating line said switching pulse is transmitted; and a plurality of triac means connected to said load corresponding to said plurality of power lines and connected to said plurality of gating lines such that one triac means is connected at only one gating line, each of said triac means for conducting said AC current flow through said load in response to said switching pulse until said AC current flow associated with a corresponding voltage line passes through zero.

2. The invention of claim 1 wherein said selection circuit means comprises isolation circuitry means for isolating each of said triac means and said load from the remainder of said selection circuit means and said comparator means.

* * * * *